April 18, 1967    W. R. WHARTON    3,315,139
CENTRIFUGAL OVERSPEED SWITCH FOR ELECTRIC MOTORS
Filed Nov. 18, 1963    3 Sheets-Sheet 1
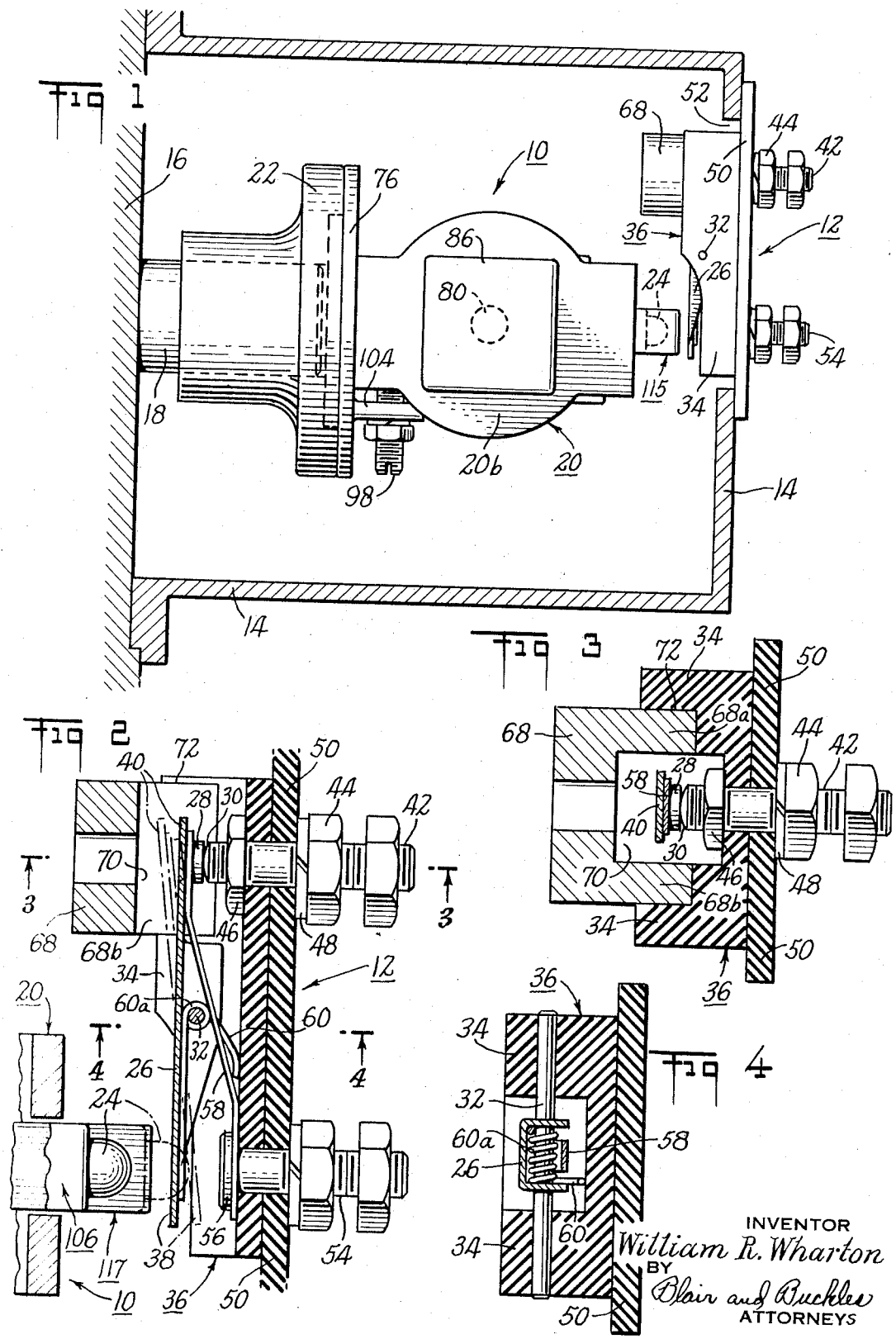
INVENTOR
William R. Wharton
BY
Blair and Buckles
ATTORNEYS

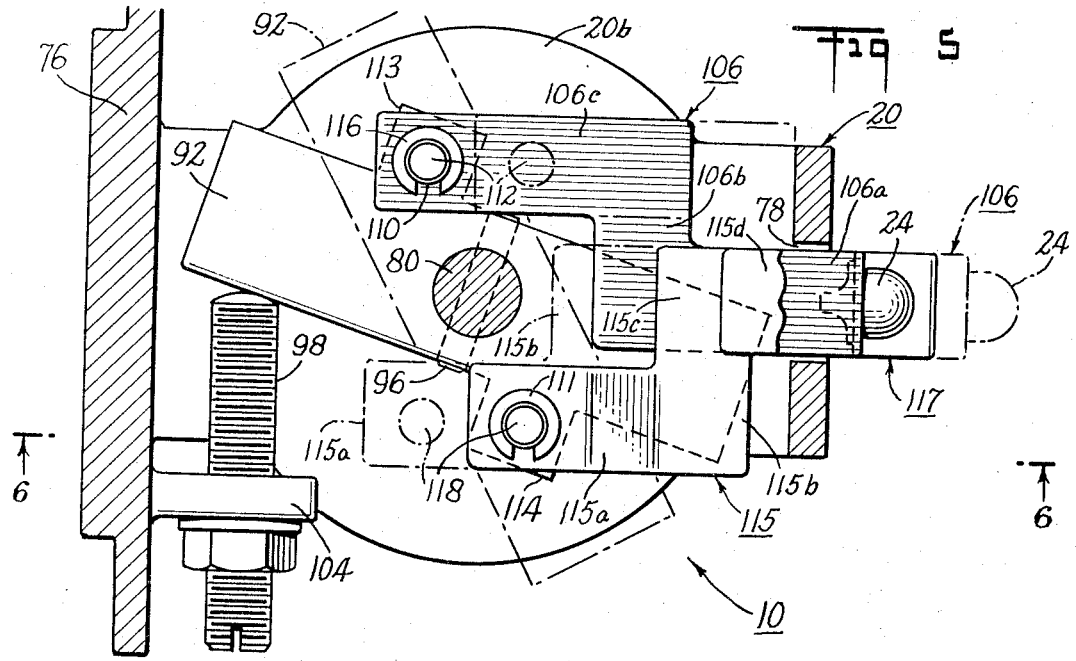
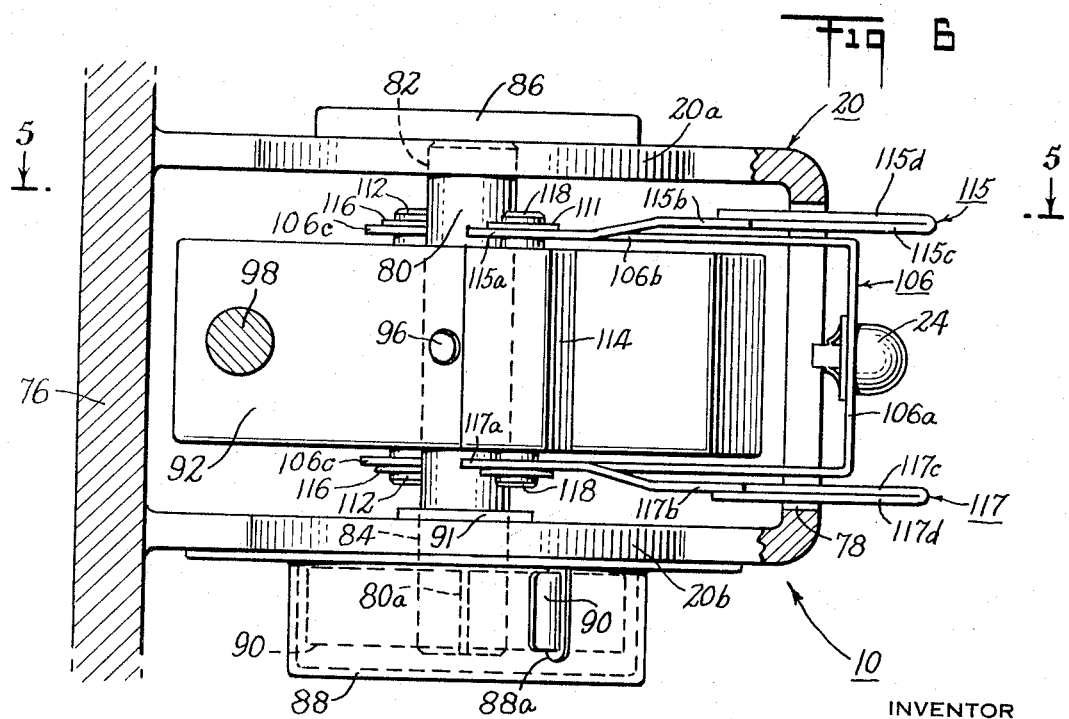

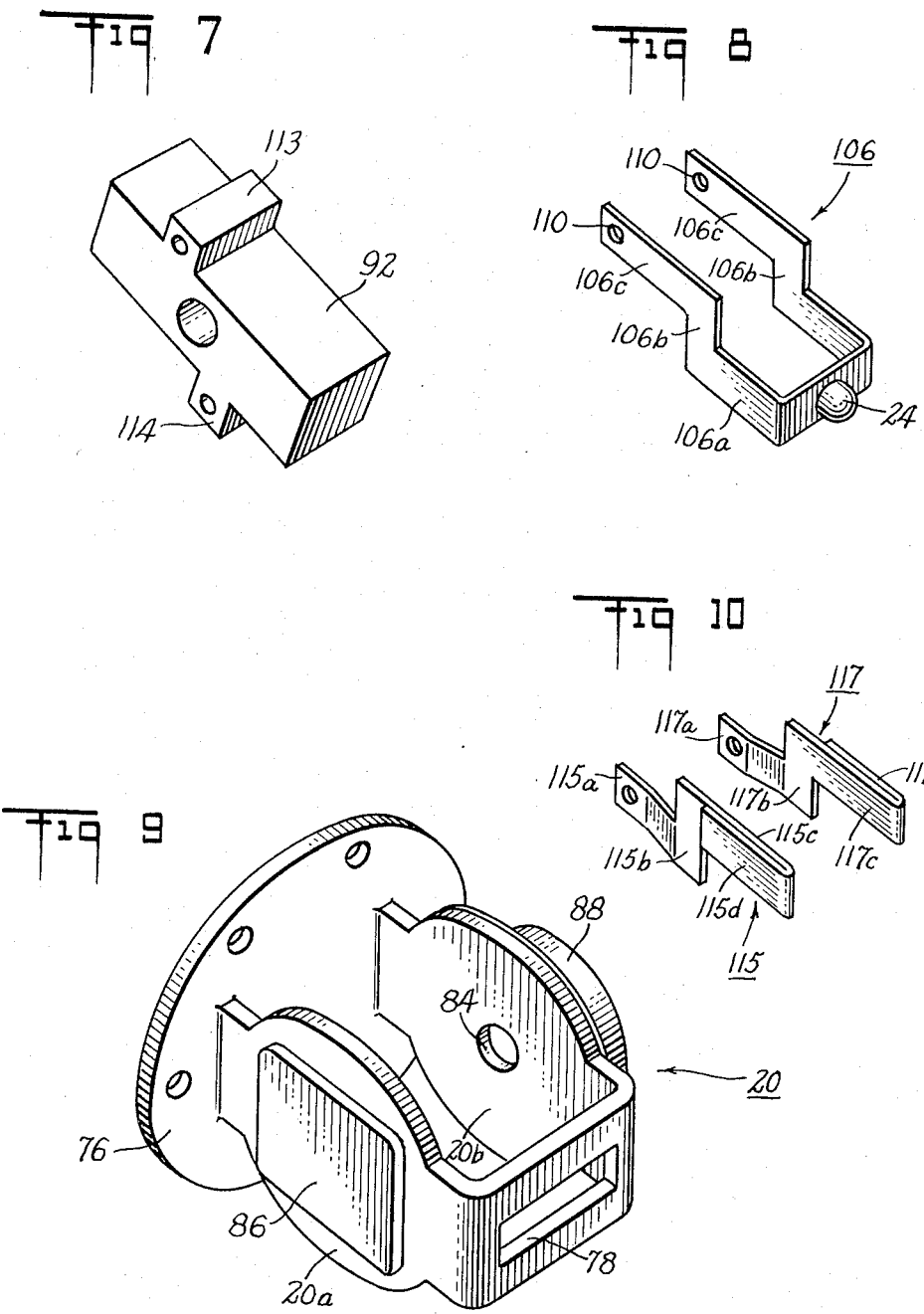

United States Patent Office 3,315,139
Patented Apr. 18, 1967

3,315,139
CENTRIFUGAL OVERSPEED SWITCH FOR ELECTRIC MOTORS
William R. Wharton, North Branford, Conn., assignor to Safety Electrical Equipment Corporation., New Haven, Conn.
Filed Nov. 18, 1963, Ser. No. 324,292
6 Claims. (Cl. 318—325)

This invention relates to centrifugal overspeed switches for rotating machinery such as electric motors, and more particularly to shock-proof overspeed switches highly resistant to vibrations or shocks produced by detonations, explosions or other causes.

Powerful, heavy-duty D.C. motors having shunt windings have been known to "run away" and explode when their shunt windings are inadvertently disconnected. Such D.C. motors are commonly used on railroad locomotives, variable-speed drives for lathes and heavy machinery, and in other cases where variable speed is required. A defective control rheostat, a loose connection or a wiring break may reduce or destroy the shunt field, allowing the D.C. motor to overspeed and creating the danger of explosion. Such accidents not only destroy the motors, but also cause serious risk of damage to surrounding installations or injury to personnel.

This danger is aggravated in movable installations such as railroad locomotives by sudden and severe impact shock loading caused by sudden stops, jolting, etc.; these conditions activate prior art overspeed switches to shunt off the motors when not desired, or they may damage the switches, making them unreliable.

The switch of the present invention avoids inadvertent switch actuation by resisting shock impacts from all directions, since it incorporates balanced spinning elements which resist displacement by sudden impacts, etc. Switch-actuating movement is produced by increased centrifugal force resulting from rotational speed increasing past a predetermined limit.

The overspeed switch of the present invention is mounted in a stationary casing fitting over the exposed end of the shaft of a unit of heavy rotating machinery, such as a large D.C. motor. Inside the stationary casing is a fixed controlling switch facing the shaft end, and a rotating actuator assembly mounted on the end of the shaft, to cooperate with the fixed switch. This actuator assembly includes a transverse pivot axle disposed crosswise of the axis of the main shaft. Pivotally carried by this transverse axle is a block having diagonally protruding ends which tend to pivot radially outwardly by centrifugal force as rotation speed increases. A counterbalanced linkage translates this pivoting radial movement into axial movement to actuate the controlling switch. This opening movement is counteracted by a spring to regulate the switch operation against the centrifugal force and thus determine the switch actuating speed.

This construction is rugged and the counterbalanced construction is highly resistant to impact shocks. Switches of this invention may be installed on motors operating near explosive detonations, such as those occurring in construction, mining and quarrying operations, without danger of damage or inadvertent actuation. They may also be used on naval ships to resist explosive impacts and other rugged treatment.

Accordingly, an object of the present invention is to provide heavy-duty overspeed switches for rotary machinery.

Another object of the invention is to provide centrifugal overspeed switches of the above character affording reliable speed-limiting control of heavy rotary machinery such as electric motors despite severe or sudden shocks sustained by the mounting supports of such machinery.

Other objects of the invention will in part be obvious and will in part appear hereinafter.

The invention accordingly comprises the features of construction, combinations of elements, and arrangement of parts which will be exemplified in the consruction hereinafter set forth, and the scope of the invention will be indicated in the claims.

For a fuller understanding of the nature and objects of the invention, reference should be had to the following detailed description taken in connnection with the accompanying drawings, in which:

FIGURE 1 is a side elevation view, partially in section, of one embodiment of the present invention;

FIGURE 2 is an enlarged fragmentary sectional side elevation of the stationary switch of FIGURE 1;

FIGURE 3 is a further enlarged horizontal sectional view taken along the line 3—3 in FIGURE 2;

FIGURE 4 is an enlarged horizontal sectional view taken along the line 4—4 of FIGURE 2;

FIGURE 5 is an enlarged fragmentary vertical sectional view of the rotary switch-actuating portion of the apparatus shown in FIGURE 1 and taken along the line 5—5 of FIGURE 6;

FIGURE 6 is a horizontal sectional view taken along the line 6—6 of FIGURE 5; and FIGURES 7, 8, 9 and 10 are perspective views of several of the individual parts of the rotary switch-actuating portion shown in FIGURES 5 and 6.

Similar reference characters refer to similar parts throughout the several views of the drawings.

Referring first to FIGURE 1, the illustrated embodiment of the invention incorporates two juxtaposed and cooperating subassemblies, i.e. the rotating actuator assembly generally indicated at 10, and the stationary switch assembly generally indicated at 12.

These two subassemblies are positioned inside a stationary switch housing 14 secured to an end casing 16 of a rotary machine (not shown) such as an electric motor having a rotating shaft end 18 whose speed is to be limited by the switching assembly to be described. Subassembly 10 is mounted in a frame generally indicated at 20 anchored to an adapter flange 22, keyed to shaft end 18.

The actuator subassembly 10 is shown in more detail in FIGURES 5 and 6 and its function is to convert the rotary velocity of shaft end 18 into radial movement to move an actuator button 24 protruding from the end of the actuator subassembly 10 linearly toward the stationary switch assembly 12. This mechanism is adjustable to regulate the movement of button 24 to engage a switch bar 26 in the stationary switch subassembly 12; this engagement may open contacts 28 and 30 of the switch at a predetermined speed of shaft end 18 in a manner to be presently described. Opening switch 12 may cut off electrical power to machine 16.

The rugged and shockproof characteristics of the present switching mechanism are achieved by firm resilient biasing of the movable parts, and also by the dynamically counterbalanced construction, in which all movable parts are supported symmetrically, and dynamic imbalance is minimized so that shock impacts produce no important shifting or relative movement of the movable actuating elements.

*Stationary switch subassembly*

Referring to FIGURES 1 and 2, the switch bar 26 is resiliently biased and switch contact 28, mounted near the upper end thereof faces fixed switch contact 30. More particularly, bar 26 is pivotally mounted on a pivot pin 32 spanning the space between two flanges 34 (FIGURES 2 and 4) of a vertical channel-shaped switch base member generally indicated at 36 formed of a dielectric material.

Switch base member 36 has a U-shaped channel cross-section (FIGURE 4) with protruding flanges 34 flanking the switch bar 26. The actuating end 38 of switch bar 26 (FIGURES 1 and 2) is directly in the path of the advancing actuator button 24 on actuator subassembly 10. As button 24 advances, it depresses end 38 of switch bar 26 to pivot it about pin 32, to the open position indicated by the dot-dash lines in FIGURE 2.

Still referring to FIGURE 2, switch contact 30 is part of a terminal stud 42, secured by nuts 44 and 46 and a lockwasher 48 cooperating to secure the switch base member 36 to a removable dielectric plate 50 which forms a closure for an access opening 52 in the switch housing 14 (FIGURE 1). A second terminal stud 54 having an enlarged head 56 is located at the lower portion of plate 50 clamping one end of a flexible contact strip 58 as shown in FIGURE 2. The opposite end of contact strip 58 is secured to contact 28 and switch bar 26 as by riveting. Pivoting movement of the switch bar 26, caused by the advancing actuator button 24 to depress the actuator end 38, effects movement of the contact 28 away from contact 30.

A spring clip 60 (FIGURE 2) has its central portion 60a coiled about pivot pin 32 (FIGURE 4) and its ends act against switch bar 26 and switch base 36 to urge switch bar 26 toward actuator button 24 to engage contacts 28 and 30. Spring clip 60 thus holds contacts 28 and 30 in engagement except when actuator button 24 depresses actuator end 38 of switch bar 26 to separate them. Thus, under usual operating conditions contacts 28 and 30 are engaged forming a circuit comprising stud 54, contact strip 58, contacts 28 and 30 and stud 42. Conductors (not shown) are suitably connected to terminal studs 42 and 54 by nuts. It will be seen that this switch may be connected in an electric motor circuit in such manner that the motor will operate unless the switch is opened by button 24 engaging switch bar 26.

A magnet 68 (FIGURES 2 and 3) encloses the contacts 28 and 30 to provide a suitable magnetic field confining arcing at the contacts. Magnet 68 is U-shaped to provide a space 70 between its legs 68a and 68b to accommodate the contact end 40 and contacts 28 and 30. A suitable recess 72, formed in flanges 34 of base member 36 accommodates the legs 68a and 68b of magnet 68, which may be secured in such position by a suitable adhesive.

*Rotating actuator subassembly*

The dynamically counterbalanced moving elements for producing the linear movement of actuator button 24 are shown in FIGURES 5 and 6. Thus, actuator subassembly 10 is mounted in the generally U-shaped actuator frame 20 (FIGURES 6 and 9), which is anchored to a base flange 76 bolted to adapter flange 22 (FIGURE 1). An aperture 78 in the opposite end of frame 20 accommodates button 24 and associated parts in a manner to be described.

An axle 80 is journalled in aligned journal apertures 82 and 84 formed in the opposite parallel arms 20a and 20b of frame 20. End enclosure plate 86 (FIGURES 6 and 9) covers journal aperture 82 to form a closed socket for axle 80 and the opposite axle end 84 extends from frame 20 into a spring housing 88 which is suitably secured to the frame 20. A snap-fitting C-ring 91 fits in a groove in this end of axle 80 (FIGURE 6) just inside journal aperture 84 to retain axle 80 against axial movement. As shown in FIGURE 6, the spring housing 88 encloses a coil spring 90 which has one end hooked through an aperture 88a in housing 88, and its opposite end in a transverse slot 80a in the axle. Spring 90 is wound around axle 80 in a direction to urge the latter in a counterclockwise direction as viewed in FIGURE 5.

A generally rectangular block 92 (FIGURES 5, 6 and 7) is mounted on axle 80 and is secured thereto by a force-fitted pin 96 so that block and axle rotate as a unit about the axis of the axle which is crosswise of the axis of shaft end 18. Further, the axis of axle 80 is located on the center of gravity of the mass of block 92. As seen in FIGURE 5, a screw 98 mounted on a bracket 104 is in the rotational path of block 92 and hence limits counterclockwise rotation thereof. Screw 98 may be adjusted to determine the position of rest of block 92 when the parts are not rotating. Spring 90 urges axle 80 and connected block 92 in a counterclockwise direction (FIGURE 5) against screw 98. Accordingly, parts will remain in a dynamically balanced condition during rotation by shaft 18 as will be explained more fully hereinafter.

Now as previously mentioned and as shown in FIGURES 5 and 6, button 24 is slidably mounted in frame 20 to move linearly toward and away from switch bar 26 (FIGURE 1). Button 24 is suitably secured to the front end of a frame generally indicated at 106 which is generally U-shaped (FIGURES 6 and 8) with a front horizontal portion 106a, a vertical part 106b and rear horizontal portion 106c. As seen in FIGURES 5 and 7, block 92 has a vertical extension 113 and a pivot pin 112 extends therethrough and through holes 110 in arms 106c. Pivot pin 112 may be held in this position in any suitable manner, for example, by C-rings 116. Accordingly, upon clockwise rotation of block 92, frame 106 will move forward to the right as viewed in the drawings toward switch bar 26.

As previously noted, it is an object of the invention to keep this entire assembly in dynamic balance during rotation thereof by way of shaft 18. Accordingly, as seen in FIGURES 5 and 7, block 92 has a depending extension 114 similar in shape, size and position to extension 113. A pin 118, held in position by C-rings 111, extends through this extension and through holes formed in two arm members generally indicated at 115 and 117. Arms 115 and 117 are identical in shape, construction and position on the opposite sides of block 92. This may be seen in FIGURE 5 where arm 115 partially appears in elevation. Thus arm 115 has a substantially horizontal portion 115a, a vertical portion 115b, and a horizontal portion 115c extending through the aperture 78. Furthermore, arms 115 and 117 are similar in shape and size to frame 106 to have substantially the same weight mass. For this purpose the extremities 115d and 117d of arms 115 and 117 are bent back on themselves.

Not only is the frame 106 designed exactly equal in weight mass to the total mass of arms 115 and 117, but the axes of pins 112 and 118 are equally offset from the opposite sides of the axis of axle 80. As previously noted, the axis of axle 80 is on the center of gravity of the block 92. Thus the part of the switch actuating assembly comprising frame 106, arms 115 and 117 and block 92 are in dynamic balance about the axis of rotation of frame 20 (FIGURE 1), i.e. the axis of rotating shaft end 18. Further still the frame 20 as best seen in FIGURE 1 is not only shaped to substantially enclose the mechanism just described but is balanced with respect to this same axis.

In operation rotation of shaft end 18 at high speeds exerts centrifugal force on the opposite ends of block 92 and spring 90 is so adjusted that the block will move outwardly to the dotted line position shown in FIGURE 5. This movement of course slides frame 106 to the right as shown in the figures and at the same time, there is a corresponding movement of arms 115 and 117 to keep the mechanism in dynamic balance despite its rotation at high speed. However, if this speed is exceeded to a dangerous degree, button 24 will engage switch bar 26 to disconnect the switch.

While this switch may be used in several ways, it can be used as an automatic safety cut-out switch in the circuit of a D.C. motor having a shunt winding to prevent such a motor from running away if its shunt windings are inadvertently disconnected. Thus, the tension of spring 90 can be adjusted so that in the normal operation of such an electric motor at selected speeds, centrifugal force on the block 92 will be insufficient to move the block far enough angularly (FIGURE 4) so that button 24 will engage switch bar 26 opening the switch. However, should the motor under the control of the switch speed up, additional rotation of block 92 engages button 24 and switch bar 26 to open the switch; this prevents excessive speed buildups.

Because of the rugged construction of this switch, but more particularly because of the dynamic balance of the switch moving parts as previously described, the switch will not open inadvertently during operation even though jarred or hit or otherwise upset by adverse conditions under which it is controlling an electric motor. For example, these switches may be used with great success as safety cutouts for electric motors on railroad locomotives where the equipment is subject to heavy jarring and jolting during operation. Many other useful situations could be cited, such as the safety control of electric rotary equipment on submarines during the firing of missiles where considerable jarring and jolting is attendant in such an operation.

It is to be noted that any shocks or sudden impacts on this switching equipment as described above, causes vibrations or displacements having either radial or axial components which are applied to the subassembly 10 and its various parts, particularly block 92, frame 106, and arms 115 and 117. Because these parts are in dynamic balance due primarily to the centrifugal forces on block 92, these displacement forces will produce no significant movement thereof, and more particularly, the position of button 24 relative to switch bar 26.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described my invention, what I claim as new and desire to secure by Letters Patent is:

1. In apparatus for controlling the speed of an electric motor by means of a switch in the circuit of the motor which switch has an actuator constructed to open when pressed, the combination of a centrifugally controlled switch-actuating mechanism including a frame connectable to the motor shaft, a bar pivotally mounted in said frame at the center of its mass on an axis at right angles to the axis of said shaft and constructed to pivot outwardly by centrifugal force upon rotation of said shaft, a switch-actuating slide mounted in said frame in alignment with said switch actuator and pivotally connected to said bar at a point spaced from the pivotal axis of said bar so that pivotal movement of said bar moves said slide toward said switch actuator, and a second slide mounted in said frame and pivotally connected to said bar on the side of its pivotal axis opposite the pivotal connection of said switch-actuating slide and equally spaced therefrom, the weight masses of said slides being equal and distributed equally with respect to the center of the mass of the bar.

2. An apparatus as defined in claim 1 wherein said bar is an elongated block-like member having protrusions on opposite side surfaces thereof disposed substantially parallel to and equally offset to opposite sides of the axis upon which said bar is mounted, said switch-actuating slide and said second slide each being pivotally mounted to one said protrusion.

3. An apparatus as defined in claim 2 wherein said switch-actuating slide comprises a generally U-shaped frame having two substantially parallel spaced legs connected at their one ends by a switch-actuating cross-bar and each pivotally connected at their other ends to one of said protrusions.

4. An apparatus as defined in claim 3 wherein the portions of said legs adjacent the ends connected to said protrusions are offset from the portions thereof adjacent the ends connected by said cross-bar.

5. An apparatus as defined in claim 3 wherein said second slide comprises a pair of substantially identical arms each pivotally mounted at a first end to the other of said protrusions, the other free end portion of each said arm being offset from the remainder of said arm and positioned adjacent the cross-bar connected end of said switch-actuating slide.

6. An apparatus as defined in claim 5 wherein said free end portion of each said arm is bent back upon itself to provide sufficient weight to counterbalance said switch-actuating slide.

References Cited by the Examiner

UNITED STATES PATENTS

| | | | |
|---|---|---|---|
| 1,014,707 | 1/1912 | Hutches | 318—325 |
| 1,570,911 | 1/1926 | Mills | 318—325 |
| 2,141,772 | 12/1938 | Stadler | 318—325 |
| 2,206,667 | 7/1940 | Field | 318—325 |
| 2,586,841 | 2/1952 | Mayer | 318—325 |
| 2,673,320 | 3/1954 | Oliwa | 318—462 |
| 2,823,549 | 2/1958 | Buckman et al. | 318—325 |
| 3,173,072 | 3/1965 | Blank | 318—325 |

ORIS L. RADER, *Primary Examiner.*

G. SIMMONS, *Assistant Examiner.*